(12) United States Patent
Lipton et al.

(10) Patent No.: US 6,987,883 B2
(45) Date of Patent: Jan. 17, 2006

(54) VIDEO SCENE BACKGROUND MAINTENANCE USING STATISTICAL PIXEL MODELING

(75) Inventors: Alan J. Lipton, Falls Church, VA (US); Niels Haering, Arlington, VA (US); Mark C. Allmen, Morrison, CO (US); Peter L. Venetianer, McLean, VA (US); Thomas E. Slowe, Middleburg, VA (US); Zhong Zhang, Herndon, VA (US)

(73) Assignee: Objectvideo, Inc., Reston, VA (US)

( * ) Notice: Subject to any disclaimer, the term of this patent is extended or adjusted under 35 U.S.C. 154(b) by 268 days.

(21) Appl. No.: 10/331,778

(22) Filed: Dec. 31, 2002

(65) Prior Publication Data

US 2004/0126014 A1    Jul. 1, 2004

(51) Int. Cl.
G06K 9/34    (2006.01)
G06K 9/00    (2006.01)

(52) U.S. Cl. ............................ 382/173; 382/171

(58) Field of Classification Search ............ 382/173, 382/174, 164, 171, 203, 205; 348/700, 701, 348/702
See application file for complete search history.

(56) References Cited

U.S. PATENT DOCUMENTS

| | | | |
|---|---|---|---|
| 5,768,413 A * | 6/1998 | Levin et al. | 382/173 |
| 6,008,865 A * | 12/1999 | Fogel | 348/700 |
| 6,195,458 B1 * | 2/2001 | Warnick et al. | 382/173 |
| 6,404,925 B1 * | 6/2002 | Foote et al. | 382/224 |
| 6,625,310 B2 * | 9/2003 | Lipton et al. | 382/173 |
| 2002/0168091 A1 * | 11/2002 | Trajkovic | 382/107 |

* cited by examiner

Primary Examiner—Vikkram Bali
(74) Attorney, Agent, or Firm—Venable LLP; Michael A. Sartori; Jeffrey W. Gluck

(57) ABSTRACT

A method for video background scene maintenance uses statistical pixel modeling. A background statistical model is built based on the input video. A background image may be built based on the background statistical model, or video segmentation into foreground and background may be carried out based on the background statistical model.

33 Claims, 13 Drawing Sheets

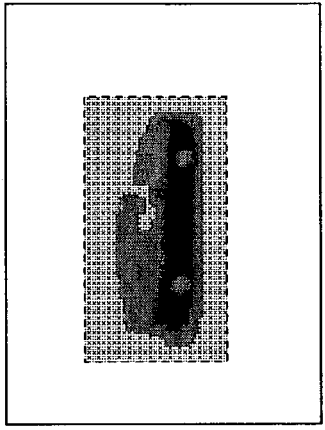
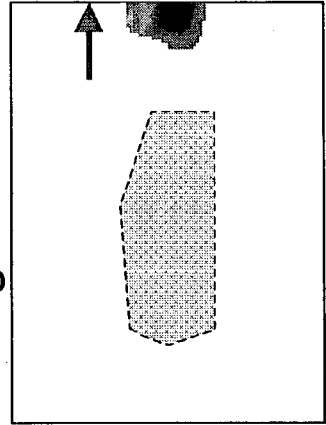
Figure 1(a)
Figure 1(b)
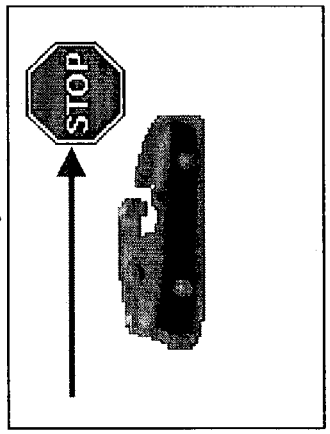
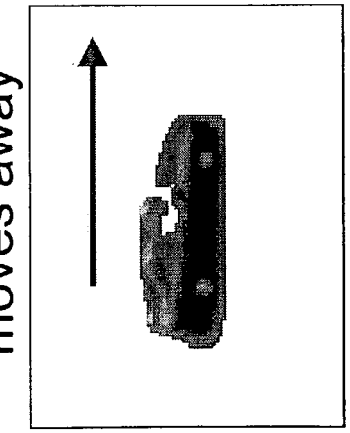
Car drives in and parks
Parked car moves away

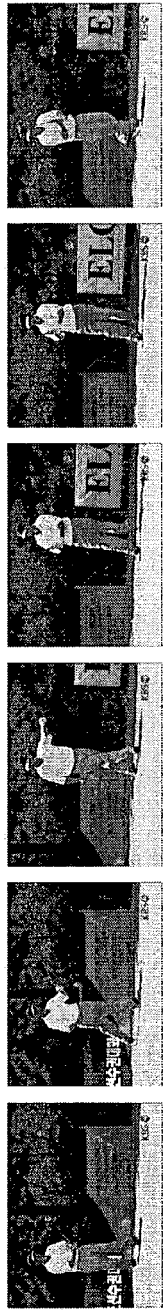
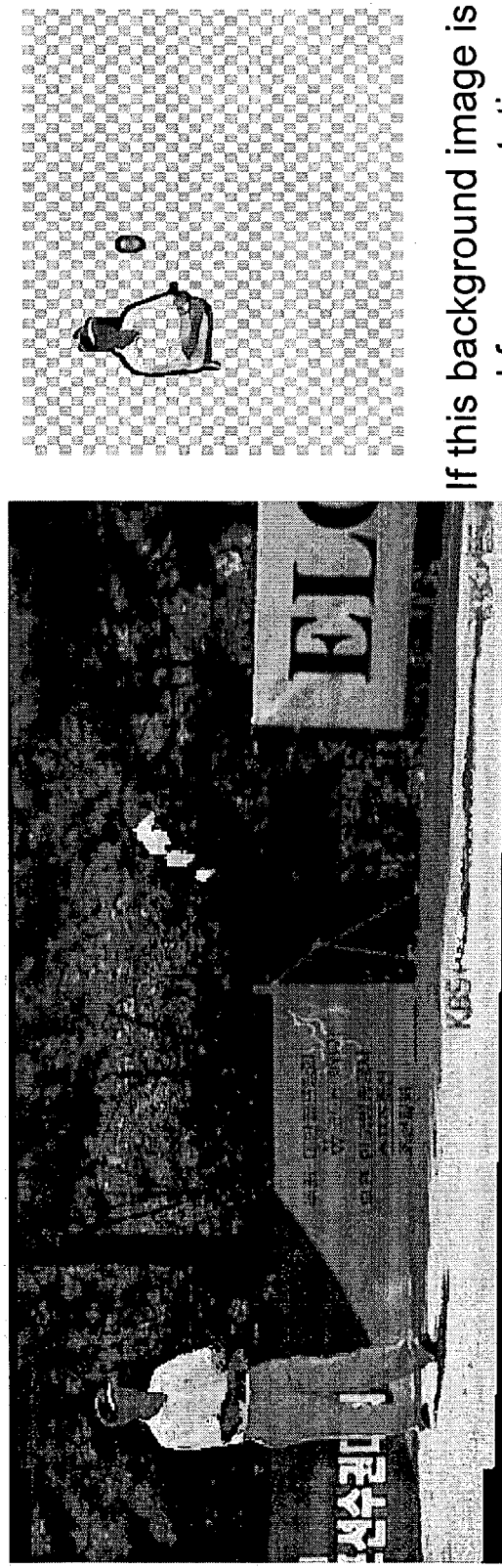
Subset of source images
If this background image is used for segmentation, incomplete segmentations will result.
Poor method of background image building. Foreground objects are "burnt-in" to the background image
Figure 2

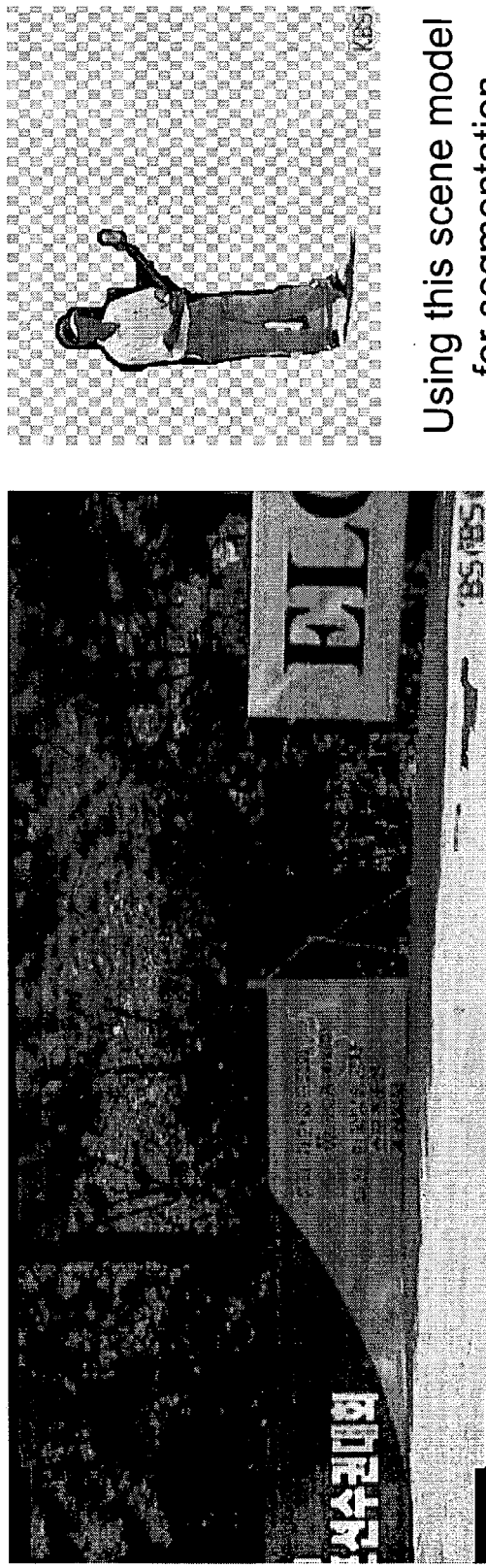
Figure 3

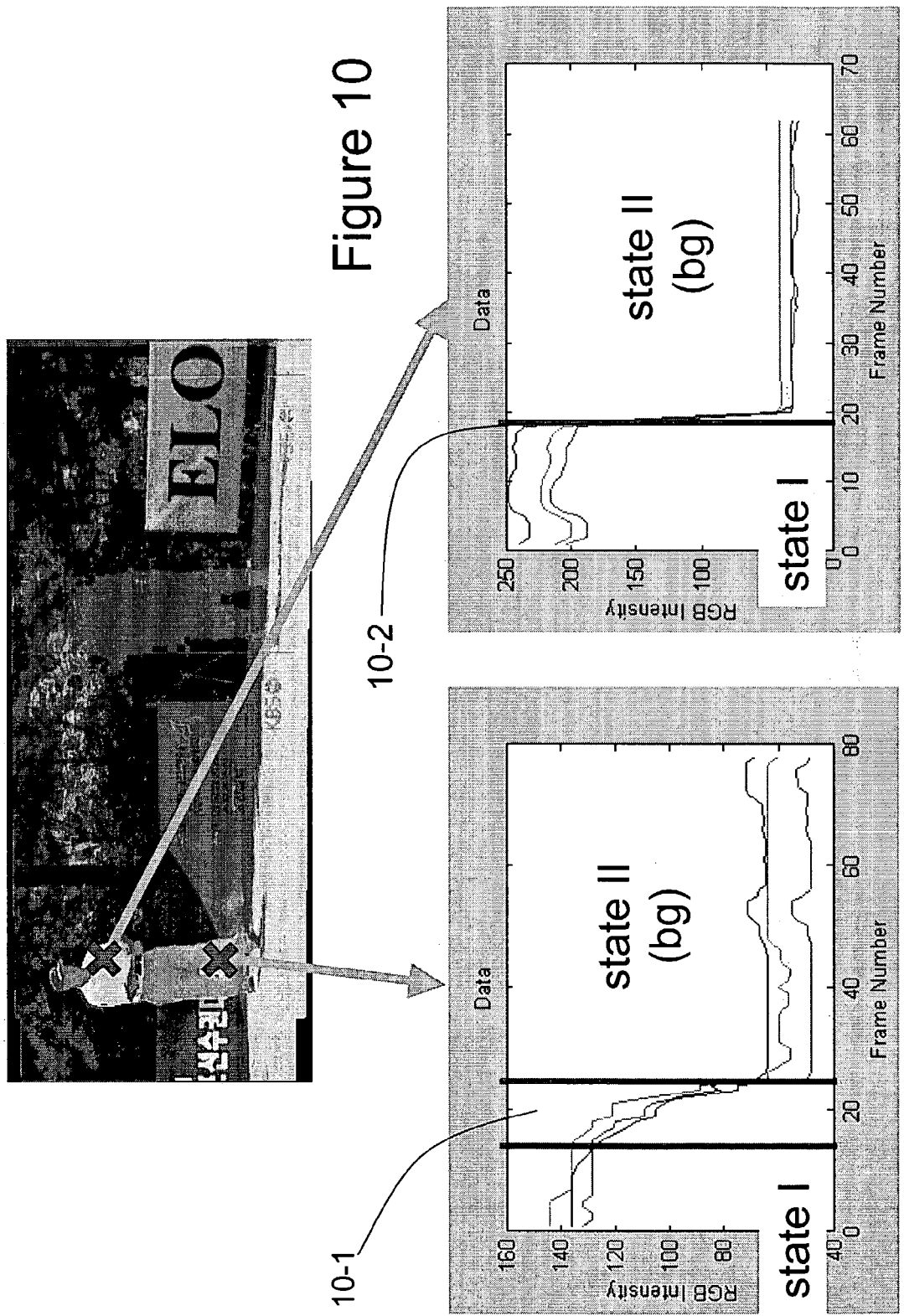

VIDEO SCENE BACKGROUND MAINTENANCE USING STATISTICAL PIXEL MODELING

FIELD OF THE INVENTION

The present invention is directed to the general field of video processing and to the more specific field of processing of segmented video. In particular, the invention is concerned with the maintenance of background scene models in segmented video.

BACKGROUND OF THE INVENTION

Many video processing applications require segmentation of video objects—that is, the differentiation of legitimately moving objects from the static background scene depicted in a video sequence. Such applications include, for example, video mosaic building, object-based video compression, object-based video editing, and automated video surveillance. Many video object segmentation algorithms use video scene background models (or simply background models) as an aid. The general idea is that each frame of a video sequence can be registered to the background model and compared—pixel by pixel—to the model. Pixels which display sufficient difference are considered foreground, or moving, pixels. There are many variations on this theme, which account for a wide range of phenomena such as:

Unstable backgrounds—such as rippling water, blowing leaves, etc.

Lighting phenomena—such as clouds moving across the sun, shadows, etc.

Camera phenomena—such as AGC, auto iris, auto focus, etc.

Using this technique (or a variation of it), it is usually possible to detect objects, or parts of objects that exhibit independent motion. There are two basic problems that arise when objects in the scene are stationary for a long period of time (to the point where they might be considered background changes), as demonstrated in FIG. 1:

If an object remains stationary for a long period of time, it could be "permanently" detected as a foreground object when, for all practical purposes, it has become part of the background.

If an object, initially stationary, is part of the background model (gets "burned in") and then moves, it will expose a region of static background that has not been modeled and will thus be erroneously detected as foreground.

Either of these phenomena can degrade the performance of video object segmentation for any application.

As discussed, for example, in U.S. patent application Ser. Nos. 09/472,162 and 09/609,919 (currently pending, filed, respectively, on Dec. 27, 1999 and Jul. 3, 2000, commonly assigned, and incorporated herein by reference in their entireties), when building photo mosaics, video mosaics, or video scene models, it is often desirable to extract those portions of the source images that represent "true" background. For example, a parked car in a video clip (or any other collection of images) that remains parked for the duration of the clip may be considered true background. But a car in a video clip that is initially parked and later drives away at some point in the clip must be considered "not background."

If care is not taken to identify true background regions, artifacts will result. If the goal is to produce a mosaic or background image, foreground objects can be "burned in," resulting in unnatural-looking imagery. If the goal is to build a scene model as a basis for video segmentation, the results can be poor segmentations, where parts of foreground objects are not detected, whereas some exposed background regions are detected as foreground. FIG. 2 shows an example of the results of allowing foreground components to corrupt the scene model.

SUMMARY OF THE INVENTION

As discussed, for example, in the aforementioned U.S. patent applications, the process of building scene models for video segmentation typically involves a step of aligning a series of images into a common coordinate system, followed by a step of selecting an appropriate representative chromatic value for each pixel in the scene model. The invention described herein pertains to the second step.

Each pixel in the mosaic or scene model represents, in some sense, a culmination of the same pixel in one or more of the source images. In simple mosaicing implementations, a "representative" chromatic value is chosen from a single source image for each pixel. In more robust implementations, all of the source pixels that contribute to the scene model pixel are considered. In some cases, the mean chromatic value is taken, in others (see, e.g., commonly assigned U.S. patent application Ser. No. 09/815,385, currently pending, filed on Mar. 23, 2001, and incorporated herein by reference in its entirety), the statistical mode, or a multi-modal running mean of all of the contributing source pixels' chromatic values is used.

The invention described is a technique for building statistical models of the chromatic values of each pixel in the scene model and applying spatial and temporal reasoning to determine a value that is most likely to represent the true background. This technique is much less susceptible to image or segmentation artifacts than the methods mentioned above. FIG. 3 shows an example of a scene model and segmentation derived from the current invention (contrast with FIG. 2, which illustrates an example of a scene model created using a different approach).

The invention comprises a technique that takes as input a temporally ordered sequence of images aligned into a common geometric coordinate system and produces as output the most likely background state for each pixel of the scene model and, for a given pixel, an indication of which frames are most likely to represent that background state. The invention encompasses two further processes: one of producing a true background image and another of producing foreground segmentations from the source images.

The invention comprises two required steps and two optional steps:

a) Building compact, multi-modal statistical descriptions for the chromatic value of each pixel in the scene model;

b) Applying spatial and temporal reasoning to these statistical descriptions to determine the most likely background state;

c) [optional] Building a background image from the chromatic values of the most likely states of each pixel; and d) [optional] Combining the statistical descriptions with the source images to segment foreground from background regions in each image—and thus the entire video.

The invention may also be embodied in the form of a computer-readable medium containing software implementing the method or as a computer system having a processor and such a computer-readable medium.

DEFINITIONS

In describing the invention, the following definitions are applicable throughout (including above).

A "computer" refers to any apparatus that is capable of accepting a structured input, processing the structured input according to prescribed rules, and producing results of the processing as output. Examples of a computer include a computer; a general-purpose computer; a supercomputer; a mainframe; a super mini-computer; a mini-computer; a workstation; a microcomputer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "computer-readable medium" refers to any storage device used for storing data accessible by a computer. Examples of a computer-readable medium include a magnetic hard disk; a floppy disk; an optical disk, like a CD-ROM or a DVD; a magnetic tape; a memory chip; and a carrier wave used to carry computer-readable electronic data, such as those used in transmitting and receiving e-mail or in accessing a network.

"Software" refers to prescribed rules to operate a computer. Examples of software include software; code segments; instructions; computer programs; and programmed logic.

A "computer system" refers to a system having a computer, where the computer comprises a computer-readable medium embodying software to operate the computer.

A "network" refers to a number of computers and associated devices that are connected by communication facilities. A network involves permanent connections such as cables or temporary connections such as those made through telephone or other communication links. Examples of a network include an internet, such as the Internet; an intranet; a local area network (LAN); a wide area network (WAN); and a combination of networks, such as an internet and an intranet.

"Video" refers to motion pictures represented in analog and/or digital form. Examples of video include television, movies, image sequences from a camera or other observer, and computer-generated image sequences. These can be obtained from, for example, a live feed, a storage device, an IEEE 1394-based interface, a video digitizer, a computer graphics engine, or a network connection.

"Video processing" refers to any manipulation of video, including, for example, compression and editing.

A "frame" refers to a particular image or other discrete unit within a video.

BRIEF DESCRIPTIONS OF THE DRAWINGS

The invention is better understood by reading the following detailed description with reference to the accompanying figures, in which like reference numerals refer to like elements throughout, and in which:

FIGS. 1(a) and 1(b) demonstrate potential pitfalls due to stationary objects in background models and segmentation;

FIG. 2 demonstrates artifacts from scene model construction where such pitfalls as shown in FIGS. 1(a) and 1(b) are not avoided;

FIG. 3 demonstrates a preferred scene model construction obtained via the use of an embodiment of the invention;

Figure 4:
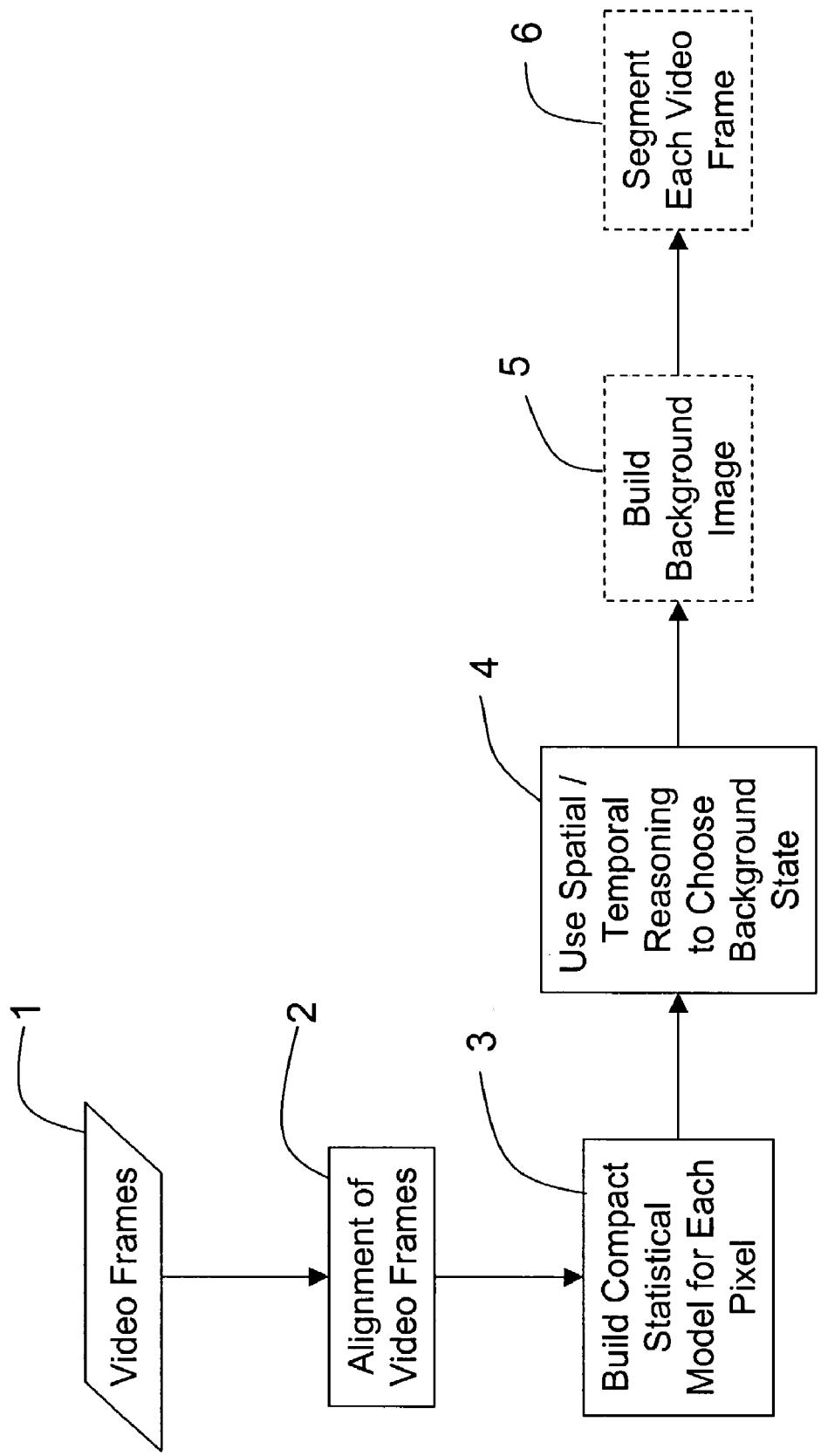
FIG. 4 shows a flowchart of a basic algorithm according to an embodiment of the invention.
Figure 5:
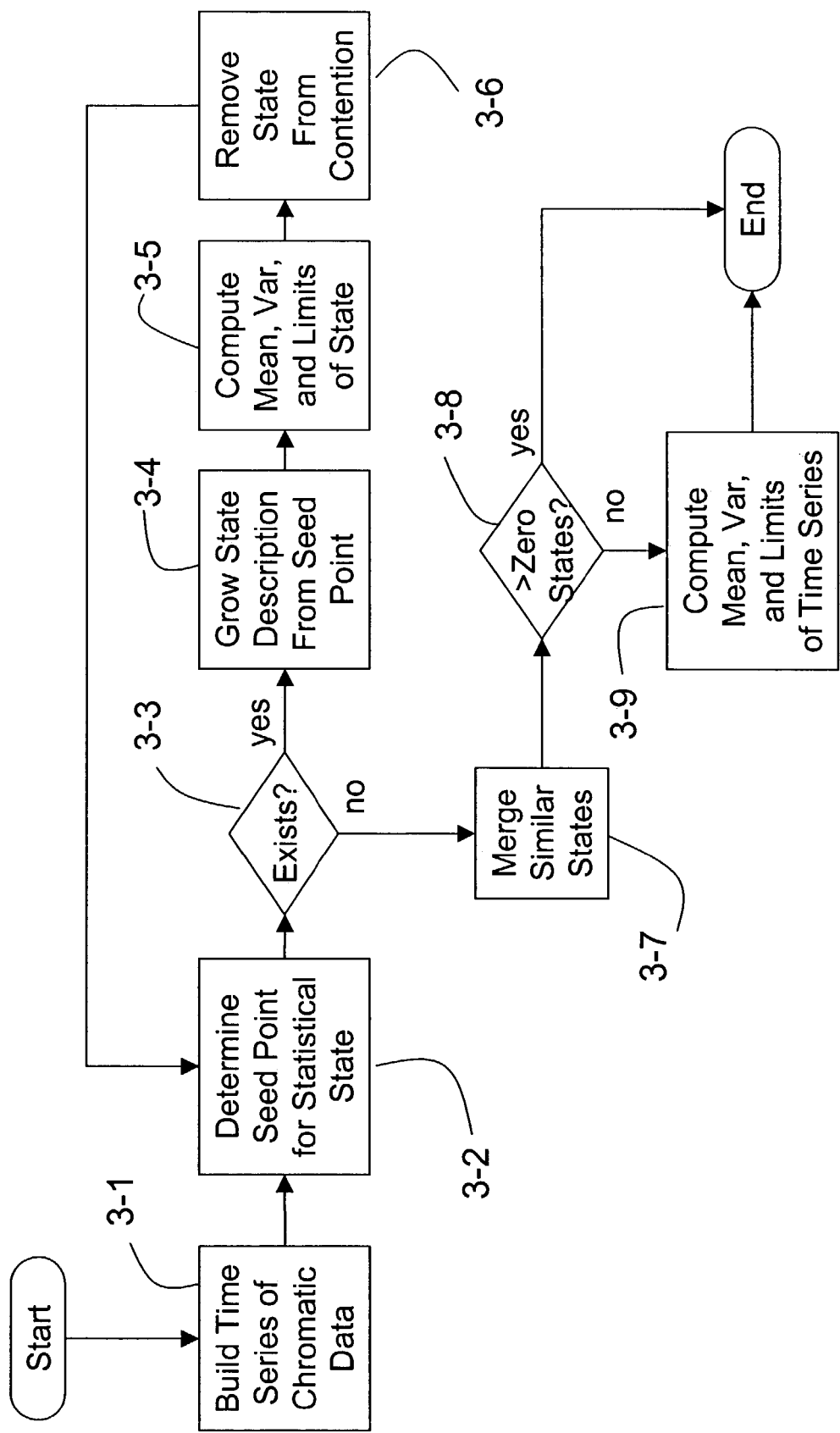
FIG. 5 shows a flowchart of an algorithm embodying Step 3 of FIG. 4.
Figure 6:
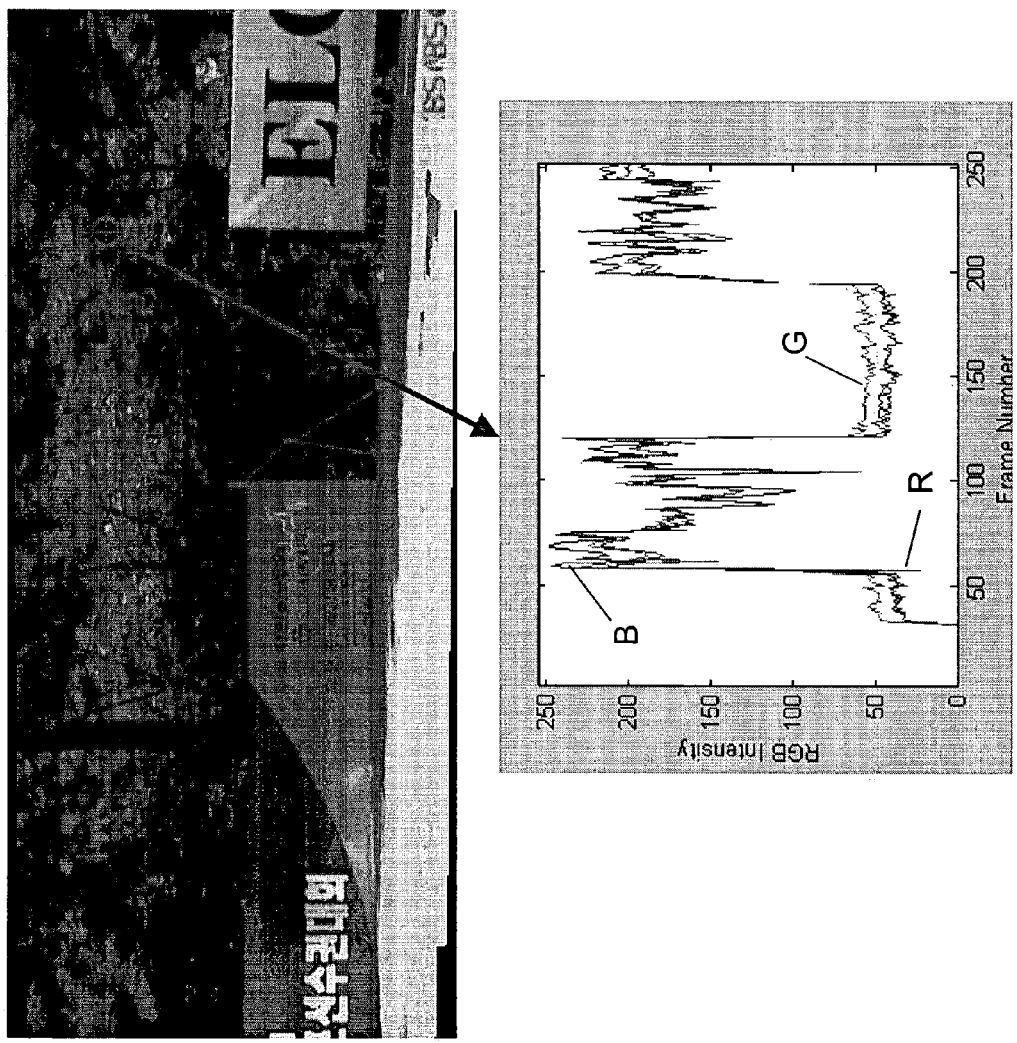
FIG. 6 shows a time series of a pixel in a scene model determined in a step of the algorithm of FIG. 5.
Figure 7:
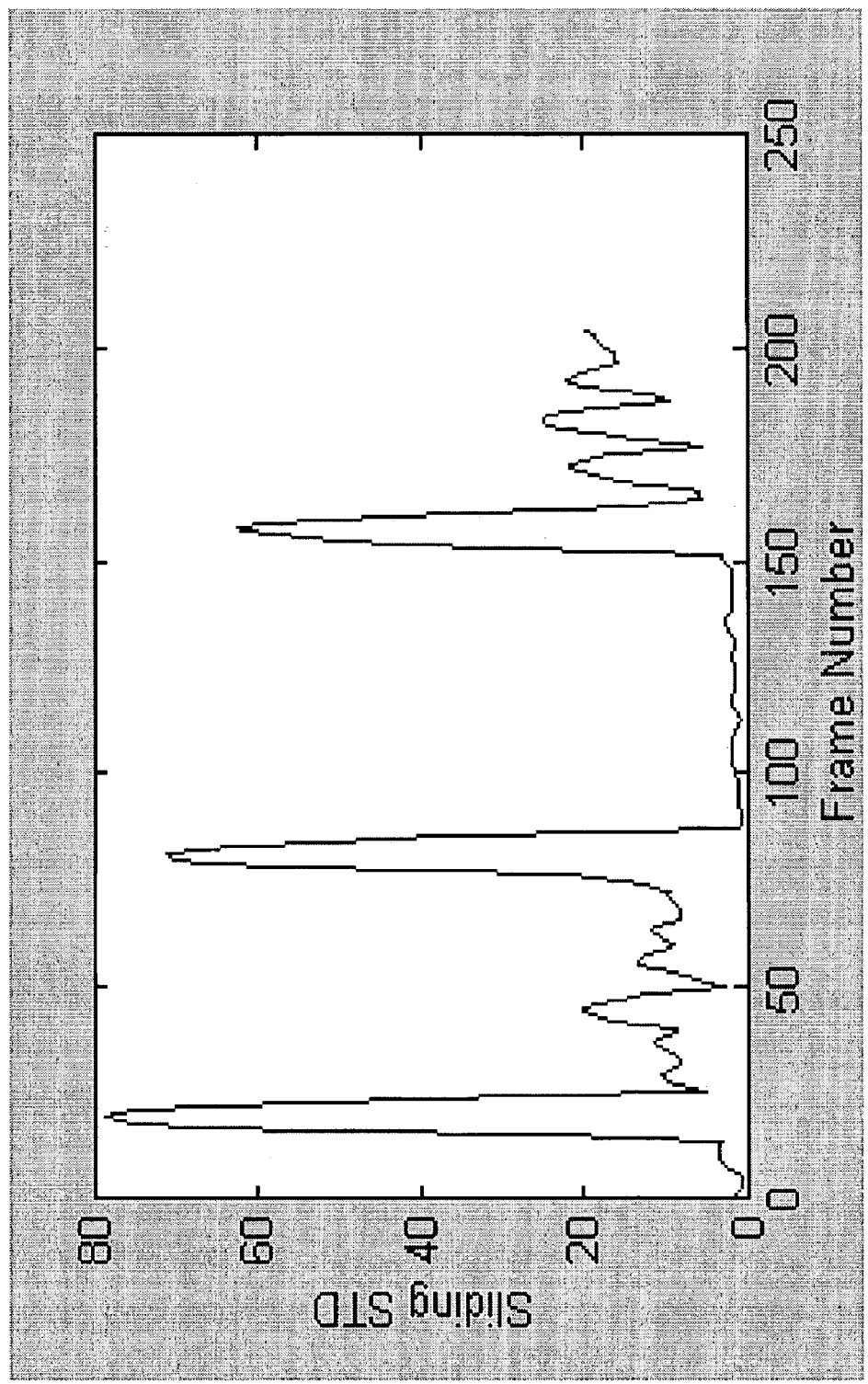
Figure 8:
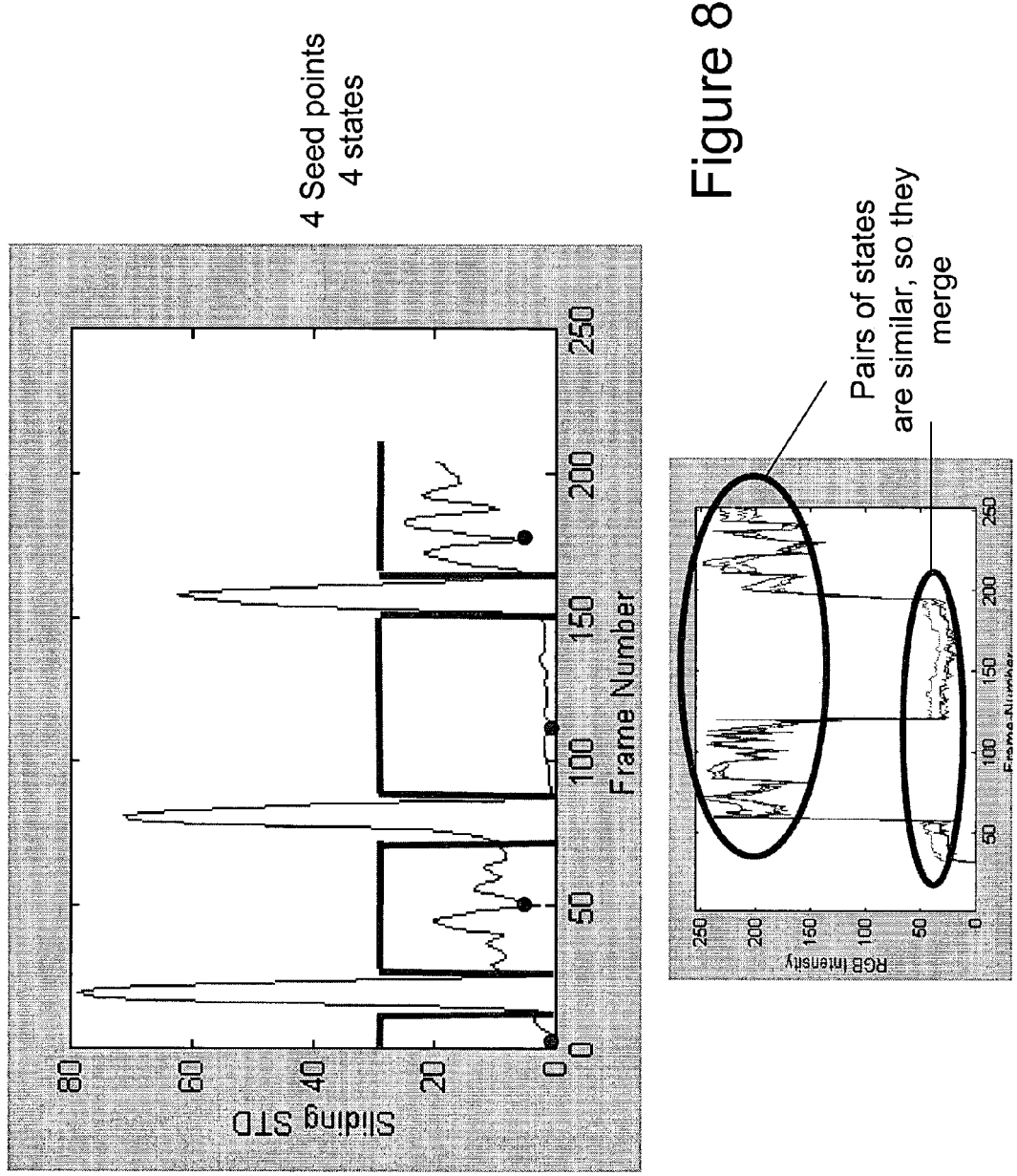
Figure 9:
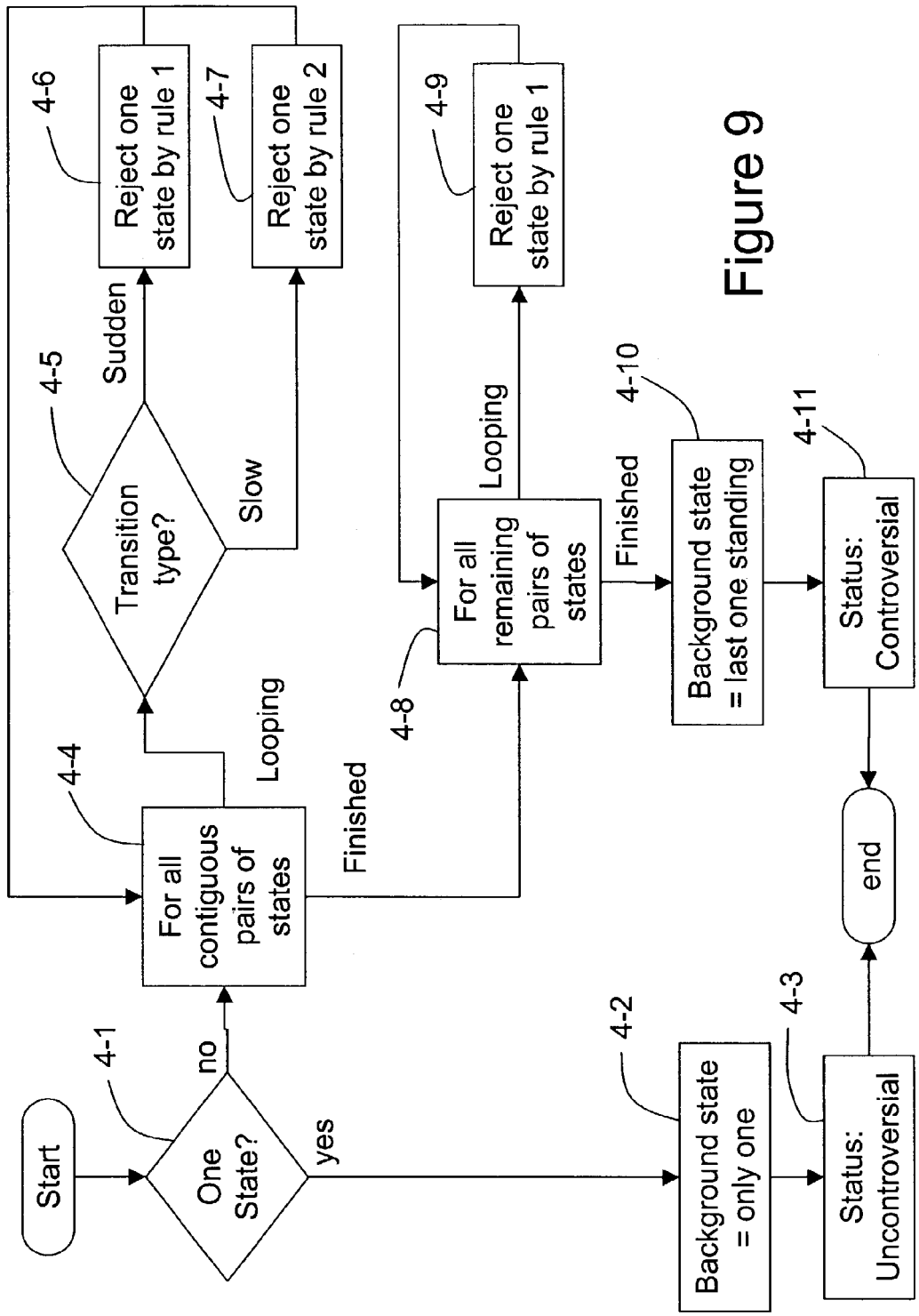
Figure 11B:
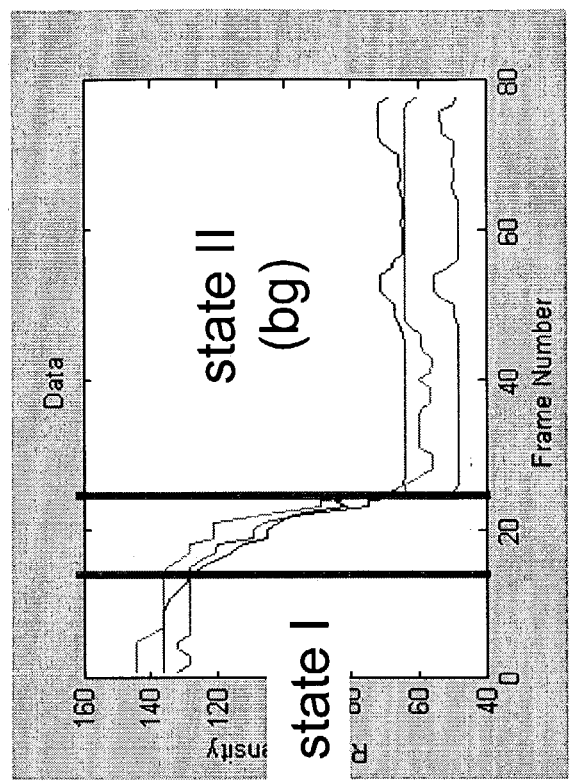
Figure 11A:
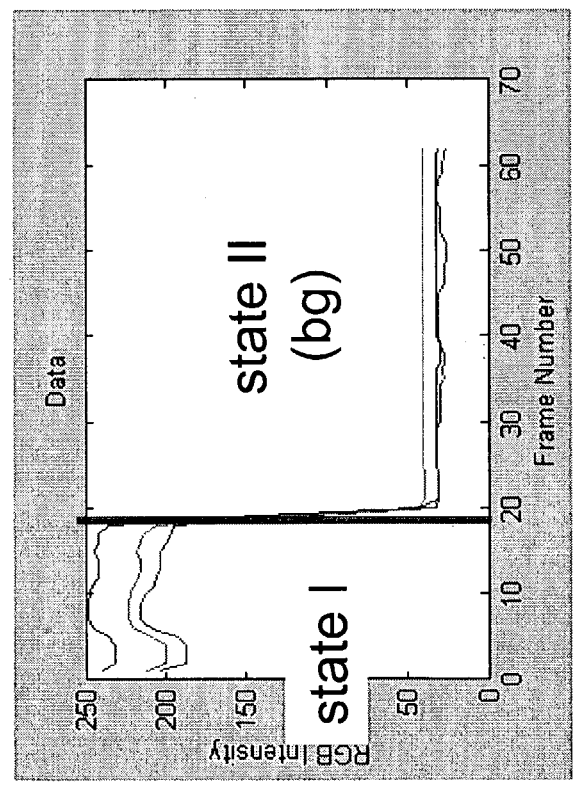
Figure 12:
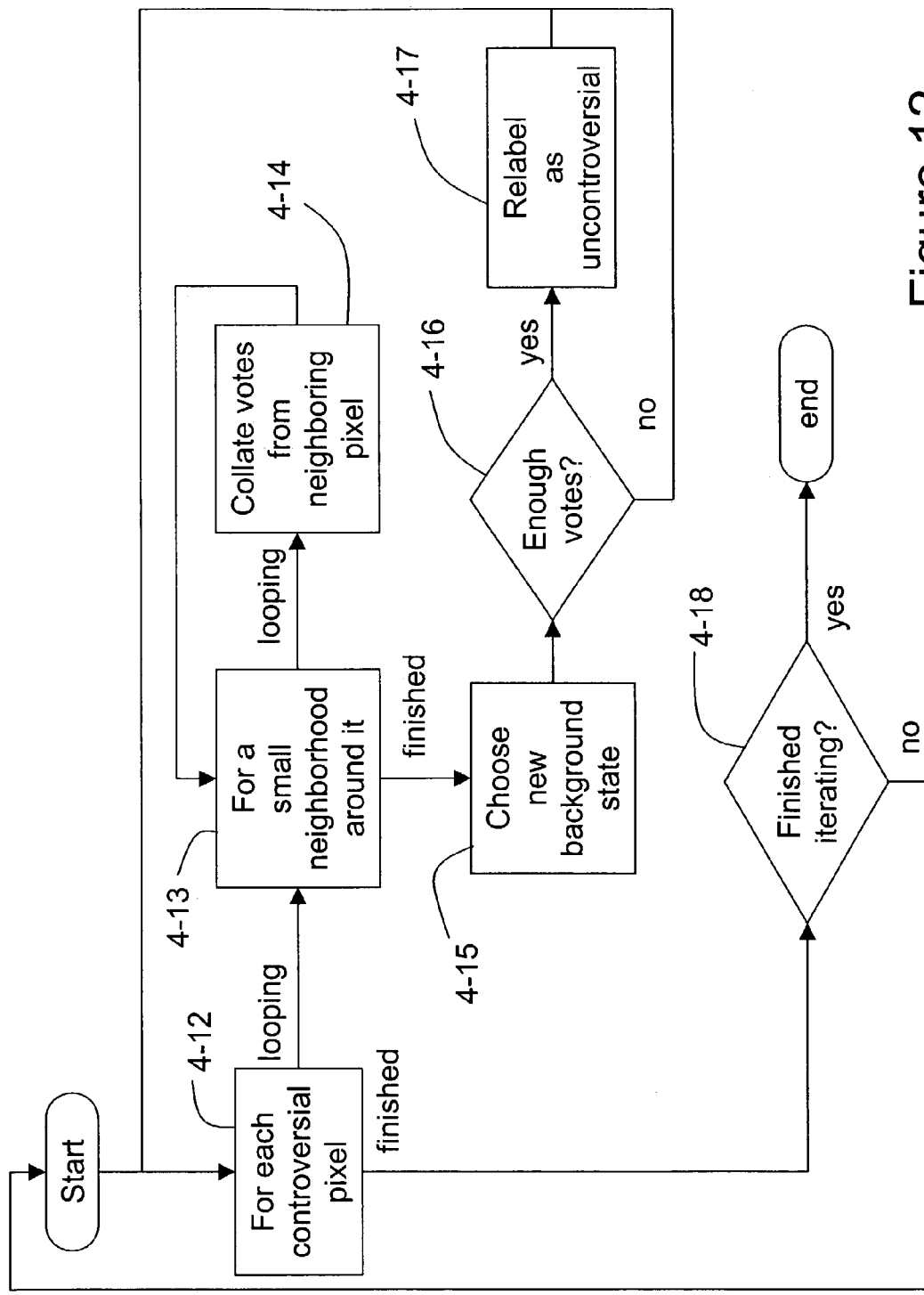
Figure 13:
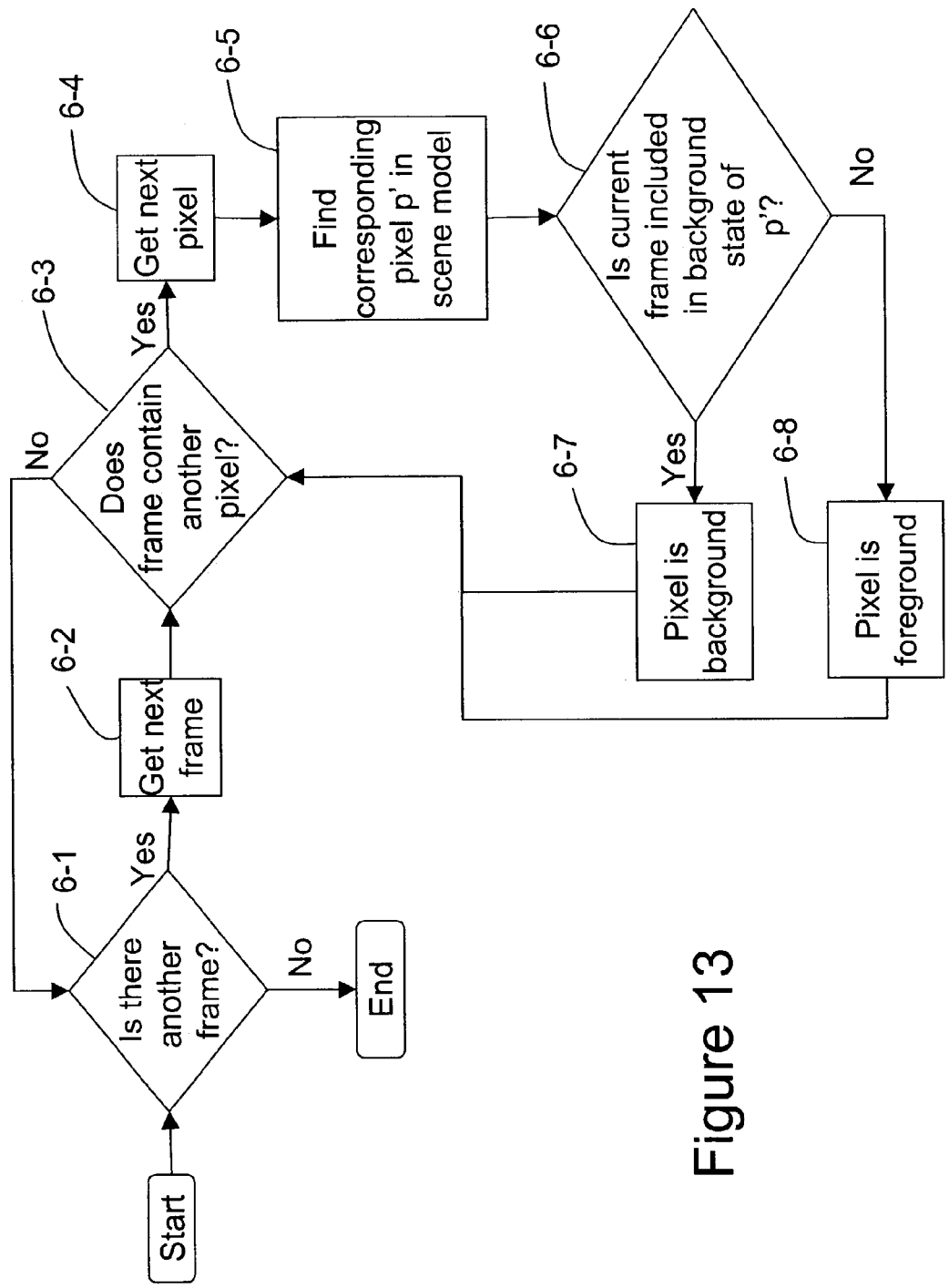

FIG. 7 comprises a plot of standard deviation of a sliding window across a sample time series;

FIG. 8 shows an application of the algorithm of FIG. 5 applied to the pixel of FIG. 6;

FIG. 9 shows a flowchart of an algorithm embodying a first sub-portion of Step 4 of FIG. 4;

FIG. 10 shows the two types of state transitions, slow and sudden;

FIGS. 11(a) and 11(b) demonstrate the use of Rules 1 and 2 for removing states from consideration in the algorithm of FIG. 9;

FIG. 12 shows a flowchart of an algorithm embodying a second sub-portion of Step 4 of FIG. 4; and FIG. 13 shows a flowchart of an algorithm embodying Step 6 of FIG. 4.

DETAILED DESCRIPTION OF EMBODIMENTS OF THE INVENTION

FIG. 4 shows a flowchart of a basic algorithm according to an embodiment of the invention. As shown in the figure, video frames 1 are fed through an alignment process 2 prior to beginning the algorithm comprising the invention, per se. Alignment is discussed, for example, in U.S. patent application Ser. Nos. 09/472,162 and 09/609,919, mentioned above. After alignment 2, the embodiment of the algorithm comprises two steps, 3 and 4, and two optional steps, 5 and 6. Steps 3–6 are described in detail below.

Step 3 involves using the aligned video frames for building compact, multi-modal statistical descriptions for each pixel in the scene model. The goal is to describe the "life" of a pixel in the scene model as a series of statistical states with temporal delimiters indicating which state describes a pixel at a particular time. A summary of an embodiment of this part of the algorithm is shown in FIG. 5. The basic idea embodied in FIG. 5 is that a time series of chromatic values for each pixel is built, and "smooth" regions are identified and grown from seed points.

Each pixel in the scene model represents at least one pixel in at least one of the source images. As shown in FIG. 5, the first stage of building a statistical description of a pixel is to build a time series of the chromatic values 3-1 of all the source pixels that contribute to that scene model pixel. The time series for a given pixel consists of the pixel's chromatic values plotted against the frame number (or frame time) from which it was taken. FIG. 6 shows a background image extracted from a video clip and a time series of pixel RGB values from the pixels in the source images that correspond to one particular scene model pixel.

The next part of the algorithm comprises dividing the time series into discrete statistical states. Clearly, different objects passing through a given pixel will demonstrate different chromatic characteristics. These different characteristics can be expressed as discrete statistical states modeled by a Gaussian time series (with a mean and variance) or by some other statistical representation. As an example, the time series in FIG. 6 clearly indicates four discrete statistical states (which appear to be two distinct states that are interleaved in time). The algorithm for extracting these states from the time series is as follows.

The first part is choosing at least one seed point for each state 3-2. A sliding window of some number of frames (nominally ten) is run over the time series, and the variance of each sub-window is computed. This can also be expressed as a time series as shown in FIG. 7 (note that the plot in FIG. 7 shows standard deviation, i.e., the square root of variance)., The point in the original time series that corresponds to the point in the sliding variance series with the lowest value (i.e., the smoothest point of the original time series) is chosen as the next seed point. If the value of the minimum variance of the sliding variance time series is above some threshold (a user parameter), the algorithm stops (i.e., there are no (further) regions of the original time series that are smooth enough to be considered statistical states) 3-3.

The next part of the algorithm comprises region growing 3-4. The region is grown from the seed point by running along the time series in both directions from the seed point until the value of any of the chromatic bands differs from the seed chromatic value by more than some predetermined threshold (K). Or, in pseudo-code:

```
for i = seed_i → 0,
    if | chromatic_value(i) - chromatic_value(seed_i) | > k
        break
    else
        left = i
end
for i = seed_i → end_of_time_series,
    if | chromatic_value(i) - chromatic_value(seed_i) | > k
        break
    else
        right = i
end
limits = left → right
```

The next part of the algorithm comprises building a description of the state 3-5. Once the delimiters of the state have been determined [left→right], a compact description of the state is computed. In the implementation shown in FIG. 5 the statistical mean and variance are used to describe the state.

Following Step 3–5, the algorithm iterates by returning to Step 3–2, via Step 3–6. In Step 3–6, all of the values of the sliding variance series between [left→right] are taken out of contention. As mentioned above, this iterative process continues until the minimum variance of the sliding variance series is above some threshold.

Once there are no further states to be extracted, the next step is to merge the discrete statistical states 3-7, as needed. As the example of FIG. 6 demonstrates, it is possible for several discrete states to be representative of the same phenomenon in the video sequence. Therefore, merging process 3-7 is applied to the list of states computed in the preceding steps. Each pair of states is considered, and if the mean and variance of a pair agree to within some predetermined tolerance, that pair is merged into a single state with combined mean and variance and a list of temporal delimiters. The result is that, ultimately, a single statistical state can be described by a mean, variance, and a list of several sets of temporal delimiters.

Following the merging of similar states 3-7, the algorithm proceeds to determine if there are any states 3-8. If a statistical description has no states, then the entire time series is taken as a state, and the mean and variance of the entire time series is taken as that state's mean and variance 3-9. The delimiters are chosen as the first and last frames of that time series.

Therefore, the final compact, multi-modal statistical description of a pixel in the scene model is a list of one or more statistical states, each consisting of a mean, variance and one or more sets of temporal delimiters. FIG. 8 shows an example of the statistical description-building algorithm of FIG. 5 applied to the pixel of FIG. 6. Here, four seed points are selected, culminating in four separate states. However, two pairs of states exhibit similar qualities and are thus merged, resulting in two states, each with two sets of temporal delimiters.

Returning now to FIG. 4, the next step in the exemplary embodiment of the invention is to apply spatial and temporal reasoning to the statistical descriptions derived in Step 3 to determine the most likely background state 4. Here, for each pixel in the scene model, a state is chosen that represents the most likely background state according to the following two observations: (a) the background state of a pixel is likely to be stable (i.e., to have a low variance), and (b) the background state of a pixel is likely to be similar to its spatial neighbors both chromatically and temporally. This process comprises two sub-parts: choosing an initial guess for the background state of each pixel (see FIG. 9); and iteratively propagating these guesses spatially to neighboring pixels to look for chromatic and/or temporal consistency (see FIG. 12).

An embodiment of the first sub-part, choosing an initial state (based on temporal considerations), is illustrated in FIG. 9. Choosing an initial guess for the background state of a pixel is done by examining the compact, multi-modal statistical description of that pixel in light of the following observation: when a foreground object occludes a background region (or a foreground object exposes a background region), a pixel is likely to undergo a transition between a relatively stable state and a relatively unstable one. Consequently, the choice of initial guess is dependent on the nature of transitions between adjacent states for a particular pixel.

The first determination is whether or not a pixel has only a single state 4-1. If this is the case, there can be no state transitions. The one state is deemed the background state 4-2, and the pixel is categorized as being "uncontroversial" 4-3. The sub-process is then complete for that pixel.

If, on the other hand, Step 4–1 determines that a pixel has more than one state, the state transitions for that pixel are then categorized. That is, the transitions are analyzed to provide an initial guess as to that pixel's background state. More specifically, the behavior of the pixel's chromatic time series in the vicinity of its transitions is considered.

As mentioned above, the background state is indicated by a transition from an unstable state to a more stable one (or vice versa), so only the part of the time series near the transition need be considered. Two types of transitions between states are observed in practice: sudden changes of state (usually accompanied by some instability in the chromatic time series on one side of the transition), and slow, indistinct changes of state, such that the chromatic value slowly slides from one state to another over a period of time. A slow transition is defined as one in which the temporal difference between the end of one state and the beginning of the next is greater than some threshold (for example, five frames or the equivalent temporal duration). A fast transition is one in which this difference is less than the threshold. FIG. 10 shows these two types of state transitions, slow (10-1) and sudden (10-2).

The process shown in FIG. 9 performs this categorization by taking a contiguous pair of states 4-4 and examining the type of transition between the two states 4-5. What rule is applied to discriminate the most likely background state depends on which type of transition exists between the two states. The rule for a sudden transition will be denoted Rule 1, and the rule for a slow transition will be denoted Rule 2. These rules are as follows:

a. Rule 1: If there is a sudden transition, the variances of the chromatic values in small windows on either side of the transition are compared. These variance values can be read directly from the appropriate location of the variance series (see FIG. 7). The state on the side of the window with the higher variance is deemed to be "not background" and is removed from consideration. (Step 4–6)

b. Rule 2: If there is a slow transition, the mean of the intervening chromatic data between the two states (i.e., in the transition region) is computed, and the state to which it is closest is deemed to be "not background" and is removed from consideration. (Step 4–7)

FIGS. 11(a) and 11(b) illustrate how Rule 1 and Rule 2 are used. In FIG. 11(a), the transition between states I and II is sudden. In a region close to the transition (i.e., the small window referred to above), the chromatic values in state I have a higher variance than those in a corresponding region close of state II close to the transition. Therefore, state I is removed from consideration.

In FIG. 11(b), the transition between states I and II is slow. The mean of the intervening chromatic data (i.e., the data between the two thick vertical lines) is computed. In this example, the mean of this data most closely matches state I, so state I is removed from consideration.

Returning to FIG. 9, once all contiguous pairs of states have been tested, there may be some remaining, non-contiguous pairs of states. These are all compared 4-8 according to the sudden transition criterion described above (Rule 1) 4-9. Although the states may not technically be contiguous, we can use Rule 1 to determine their behavior as they transition. That is, if one has a high variance just before it transitions in the temporal direction of the other and the other has a low variance just after it transitions from the temporal direction of the first, the latter could be considered more stable, and thus background (in other words, this may be described as taking the temporally closest ends of the two states, taking small windows at these temporally closest ends, and determining which of the windows has the lower variance). This process continues until only a single state remains (i.e., for each pair of states, the one with the higher window variance is eliminated in each step of the process). This is taken as the initial guess background state 4-10 and is categorized as being "controversial" 4-11.

The second sub-step of Step 4 (of FIG. 4) comprises a process of propagating the choices spatially. An embodiment of this sub-step is shown in FIG. 12. The idea of this sub-process is as follows. Given the high levels of noise and uncertainty in the time series of the chromatic values of each of the various pixels, it is likely that the initial estimates of background states will be inaccurate. Considering the neighboring pixels, however, can strengthen these estimates. As mentioned above, background states between neighboring pixels are likely to correlate both chromatically and temporally. Therefore, a voting scheme may be used to allow neighboring pixels to contribute to the final decision on a pixel's background state in an embodiment of the invention.

Furthermore, given that each voting pixel may, itself, be uncertain, an iterative scheme may be used. Note, also, in this iteration, that voting based on chromatic considerations is decoupled from voting based on temporal considerations—although, in practice, there is no need for this separation, and this formulation of the algorithm is included by implication in this disclosure.

FIG. 12 illustrates a flowchart of the iterative voting scheme. Neighboring pixels vote based on their own choice of background state. Votes are weighted according to their status. Uncontroversial pixels have higher weighted votes than controversial ones.

The first part of the process of FIG. 12 is to propagate choices spatially based on chromatic criteria. At the beginning of each iteration, each pixel will know a guess as to its background and will know if it is uncontroversial or not; these are determined in the first part of Step 4, as discussed above. During each iteration, each pixel gets to vote based on its current guess of its own background state. At the end of each iteration, any pixels that are deemed to have enough evidence to support the choice of a final background state are relabeled as uncontroversial for the next iteration. Iterations continue until all of the pixels are classified as uncontroversial or after some predetermined number of iterations has occurred. FIG. 12 depicts this scheme.

The chromatic voting scheme proceeds as follows. For each controversial pixel in the scene model 4-12, a spatial neighborhood is selected to vote on the final background state 4-13. Each pixel in this neighborhood gets to vote. The algorithm allows two types of votes: votes in favor of a particular state, and votes against a particular state. If [s1, . . . , sn] are the states of the pixel in question and [S1, . . . , Sm] are the states of a neighboring pixel, and if Sb∈[S1, . . . , Sm] is the chosen background state of the neighboring pixel, the neighboring pixel can cast votes as follows:

$$\text{if } Sb \approx s_i \in [s1, \ldots, sn], s_i \text{ gets } \begin{cases} k1, & \text{controversial} \\ k2, & \text{uncontroversial} \end{cases} \text{votes}$$

(i.e., if the background state of the neighboring pixel matches a state of the current pixel, it can contribute some number of votes to that state, where, in an embodiment of the invention, that number of votes can be dependent on whether or not the neighboring pixel is uncontroversial.)

$$\forall S_i \in [S1, \ldots, Sm] \wedge Sb:S_i \approx s_j \in [s1, \ldots, sn], s_j \text{ gets}$$

$$\begin{cases} -k3, & \text{controversial} \\ -k4, & \text{uncontroversial} \end{cases} \text{votes}$$

(i.e. if the neighbouring pixel has a "not background" state that matches a state of the current pixel, it can subtract votes from that state. The number of votes subtracted may depend on whether the neighboring pixel is uncontroversial.)

k1→k4 may be considered user parameters. In one exemplary implementation, k1=k3= 0.5, k2=k4=1.0 were chosen, although a wide range of values also provided similar results. At the end of each iteration, the state $s_j$ that received the largest number of votes is taken as the background state for the next iteration 4-15. If $s_j$ received enough votes 4-16 (again, a user parameter), its status can be changed to uncontroversial for the next iteration 4-17. In one exemplary implementation, 80% of the size of the neighborhood was chosen as the user parameter determining how many votes were "enough," although a wide range of values provided similar results. A higher number (90%) took longer to converge but provided slightly better results than a lower number (60%).

The second part of the process of FIG. 12 is to propagate choices spatially based on temporal criteria. The first iterative loop (described above) spatially propagated information based on chromatic matching. Of equal importance is the observation that background states are likely to co-exist temporally among neighboring pixels. If, in the first iterative loop, two neighboring pixels were assigned particular background states that did not match temporally, it would be an indication that something was wrong. Therefore, a second iterative loop may be performed to propagate state information spatially among neighbors based on temporal considerations.

The second iterative loop follows procedures analogous to those of the first iterative loop and can, thus, also be described using FIG. 12. To begin, each pixel is compared with each of its eight immediate spatial neighbors. If the pixel's chosen background state does not temporally overlap the background state of any one of its neighbours, it is considered temporally controversial and is subjected to the procedures of the second iterative loop.

In each iteration of the second iterative loop, for each pixel determined to be temporally controversial 4-12, a small spatial neighborhood of pixels is chosen around the pixel 4-13. In fact, the same size neighborhood can be chosen for both the spatial and temporal propagation steps if desired. The neighboring pixels are allowed to vote for states of that pixel 4-14. The iterations continue until there are no more temporally controversial pixels or until a prescribed number of iterations have occurred.

The temporal voting scheme is as follows. If [s1, ..., sn] are the states of the current pixel and [S1, ..., Sm] are the states of a neighboring pixel, and if Sb∈[S1, ..., Sm] is the chosen background state of the neighboring pixel, it can cast votes as follows:

if Sb maximally overlaps $s_i \in$[s1, ..., sn] temporally,
$s_i$ gets $$\begin{cases} k5, & \text{temporally\_controversial} \\ k6, & \text{temporally\_uncontroversial} \end{cases} \text{votes}$$

(i.e., the state of the current pixel, which maximally temporally overlaps the chosen background state of the neighboring pixel, gets some votes. Temporally uncontroversial pixels may contribute votes differently from temporally controversial ones.)

In the above, "maximal overlap" is determined by looking at the temporal delimiters associated with both states. If Tb is the total duration of state Sb (i.e., all the frames in which the neighboring pixel was in state Sb) and Ti is the total duration of state si (i.e., all the frames in which the current pixel was in state si), overlap is defined as:

$$\text{Overlap} = \frac{T_i \cap T_b}{\min(T_i, T_b)}$$

That is, when comparing Sb to all of the s's, if si is the state that has the largest value of overlap (as defined above), it gets to vote. Put another way, if Sb temporally overlaps with si better than any other state of the current pixel, it gets to vote.

Also in the above, the choices of k5 and k6 are made by the user. In an exemplary implementation, k5=0.5 and k6=1.0 were used, although any reasonable values would suffice. Again, at the end of every iteration, temporally controversial pixels that have enough votes (as defined by the user; in an exemplary implementation, 80% of the neighborhood size was chosen as the threshold, although any reasonable value would work, as well), 4-16 may be relabeled as temporally uncontroversial for the next iteration 4-17.

As shown in FIG. 4, there are two optional steps in the illustrated embodiment of the invention. The first, Step 5, is building a background image from the chromatic values of the most likely states of each pixel. After both iterative loops have finished, each pixel in the scene model will have a compact, multi-modal statistical model of its chromatic data and a label as to which state is most likely to represent the background. To build a background image from the scene model, Step 5 takes the mean of the background state for each pixel and uses that as the chromatic value at each location in the background image.

The second optional step, Step 6, is to combine the statistical descriptions with the source images to segment foreground from background regions in each image. An embodiment of this step is shown in FIG. 13. After both iterative loops have finished (i.e., in Step 4), each pixel in the scene model will have a compact multi-modal statistical model and a label as to which state is most likely to represent the background. It is straightforward to use this information to segment the foreground objects from a video stream.

As shown in FIG. 13, it is first determined if all frames have been examined 6-1. If there is another frame to be examined, the next frame is retrieved 6-2; otherwise, the process is finished. Next, Step 6–3 determines whether or not all pixels in the current frame have been examined. If there are none, then the process loops back to Step 6–1; otherwise, the next pixel is retrieved 6-4. For the current pixel, the process then finds the corresponding pixel (p') in the scene model 6-5 (i.e., the scene model built in Step 5). It is then determined if the current frame is included in the background state of pixel p' 6-6. This is done by examining the temporal delimiters of the background state of the pixel. If the frame number (or frame time) of the current frame is within the temporal range of the background state, the pixel may be considered to be in the background state of pixel p'; if not, it may not. If the current frame is included in the background state of pixel p', then the current pixel is background in the current frame 6-7. If not, then the current pixel is foreground in the current frame 6-8. From either Step 6–7 or Step 6–8, the process loops back to Step 6–3.

The invention has been described in detail with respect to preferred embodiments, and it will now be apparent from the foregoing to those skilled in the art that changes and modifications may be made without departing from the invention in its broader aspects. The specific examples and embodiments described herein are not intended to limit the scope of the invention. The invention, therefore, as defined in the appended claims, is intended to cover all such changes and modifications as fall within the true spirit of the invention.

What is claimed is:

1. A method of video scene background maintenance for a sequence of video frames, comprising the steps of:
   aligning the video frames;
   building a statistical model for each pixel of the aligned video frames, comprising the steps of:
      building a time series of chromatic data for each pixel;
      determining zero or more candidate states for each pixel based on the time series for the pixel; and
      computing statistical quantities for the states based on the time series; and
   choosing a background state for each pixel of the aligned video frames.

2. The method according to claim 1, wherein the step of determining zero or more candidate states comprises the steps of:
   determining if there exists a seed point for a state in any portion of the time series for which a state has not yet been determined; and
   if such a seed point does exist, growing a state description from the seed point.

3. The method according to claim 2, wherein the step of determining if there exists a seed point comprises the steps of:
   running a sliding window of a predetermined duration across the time series, thus producing a series of windowed regions;
   computing a variance over the values in each windowed region, thus producing a time series of variances; and
   determining a minimum point of the time series of variances; and
   if the minimum point falls below a predetermined threshold, selecting a corresponding point in the original time series as a seed point.

4. The method according to claim 3, further comprising the step of:
   if the minimum point of the time series of variances exceeds the predetermined threshold, determining that there is no further seed point in the time series.

5. The method according to claim 2, wherein the step of growing a state description from the seed point comprises the steps of:
   determining a left delimiting value of the state; and
   determining a right delimiting value of the state;
   wherein each of the steps of determining a left or right delimiting value comprises the steps of:
      selecting the next point in the time series in a respective left or right direction;
      determining if the chromatic value of the next point differs from the seed point by more than a predetermined threshold amount;
      if the chromatic value of the next point differs from the seed point by no more than the predetermined threshold amount, setting the value of the respective left or right delimiting value equal to the next point, and returning to the step of selecting a next point; and
      if the chromatic value of the next point differs from the seed point by more than the predetermined threshold amount, ending the respective step of determining a left or right delimiting value.

6. The method according to claim 5, further comprising the step of:
   removing from further consideration for determining additional states all points of the time series between the left and right delimiting values.

7. The method according to claim 1, wherein the statistical quantities for each state include a mean and a variance, and wherein the method further comprises the step of:
   merging similar states.

8. The method according to claim 7, wherein the step of merging similar states comprises, for each pair of states, the steps of:
   comparing the means and the variances of the two states;
   if the means and variances agree to within a predetermined tolerance, combining the states into a single state having a combined mean and variance and a list of temporal delimiters.

9. The method according to claim 7, further comprising the steps of:
   determining if there is at least one state; and
   if not, taking the entire time series as a single state, having the mean and variance of the entire time series.

10. The method according to claim 1, further comprising the step of:
    building a background image based on the background statistical model.

11. The method according to claim 10, wherein the step of building a background image comprises the step of:
    taking a mean value of the background state for each pixel in the background statistical model and using the mean value as the chromatic value for that pixel of the background image.

12. The method according to claim 1, further comprising the step of:
    segmenting video frames into foreground and background regions based on the statistical background model.

13. The method according to claim 12, wherein the step of segmenting comprises the steps of:
    for each frame, finding a pixel p' in the scene model that corresponds to each pixel p of the frame;
    determining if pixel p is included in the background state of p'; and
    if the result of the determining step is positive, deciding that p is a background pixel and, otherwise, deciding that p is a foreground pixel.

14. The method according to claim 13, wherein the step of choosing a background state for each pixel includes the step of:
    providing a temporal description of the background state of each pixel.

15. A computer-readable medium containing instructions that, when executed by a processor, cause the processor to perform the method according to claim 1.

16. A computer system comprising:
    a processor; and
    the computer-readable medium according to claim 15.

17. A method of video scene background maintenance for a sequence of video frames, comprising the steps of:
    aligning the video frames;
    building a statistical model for each pixel of the aligned video frames; and
    choosing a background state for each pixel of the aligned video frames, comprising the
    choosing a background state for each pixel of the aligned video frames, comprising the steps of:

choosing an initial guess for a background state of each pixel, comprising the steps of:
  determining if the pixel has only a single state;
  if so, setting the background state to that single state and labeling the pixel uncontroversial; and
  if not, choosing one of multiple states of the pixel as the background state for the pixel and labeling the pixel controversial, comprising the steps of:
    determining if a state transition between a pair of contiguous states for the pixel is slow or sudden;
    if there is a sudden transition between the pair of contiguous states, performing the steps of:
      computing variances of chromatic values in small windows to each side of the transition; and
      determining the state on the side of the window having the higher variance to be not background and removing it from consideration as a background state; and
    if there is a slow transition between the pair of contiguous states, performing the steps of:
      computing the mean of the data between the two states; and
      determining the state that is closest to the mean of the data between the two states to be not background and removing it from consideration as a background state; and
  iteratively propagating the initial guesses spatially to neighboring pixels.

18. The method according to claim 17, wherein the step of choosing one of multiple states of the pixel as the background state for the pixel and labeling the pixel controversial further comprises the steps of:
  for pairs of remaining states, computing a variance of chromatic values in a small window at the end of each of the pair of states that is temporally closer to the other of the pair of states;
  determining the state with the higher variance near the end to be not background and removing it from consideration as a background state; and
  repeating the previous two steps until there is only one state remaining, which state is taken as the initial guess background state for the pixel and is labeled controversial.

19. The method according to claim 17, wherein the step of iteratively propagating the initial guesses spatially to neighboring pixels comprises the steps of:
  selecting a neighborhood of pixels around a controversial pixel;
  for each pixel in the neighborhood of pixels, selecting a number of votes for a background state of the controversial pixel based on a background state of the pixel in the neighborhood;
  selecting a background state of the controversial pixel based on the votes.

20. The method according to claim 19, wherein the step of iteratively propagating the initial guesses spatially to neighboring pixels further comprises the step of:
  for each pixel in the neighborhood of pixels, weighting the number of votes selected for a background state of the controversial pixel based on whether the pixel in the neighborhood is controversial or not.

21. The method according to claim 19, wherein the step of selecting a background state of the controversial pixel comprises the step of choosing the background state of the controversial pixel to be a state having the greatest number of votes among all pixels in the neighborhood of pixels.

22. The method according to claim 21, further comprising the steps of:
  testing to determine if the number of votes for the chosen background state exceeds a predetermined number; and
  if the number of votes exceeds the predetermined number, relabeling the controversial pixel as uncontroversial.

23. The method according to claim 22, further comprising the step of performing further iterations, beginning with the step of selecting a neighborhood of pixels around a controversial pixel, until there are no pixels labeled controversial.

24. The method according to claim 22, further comprising the step of performing further iterations, beginning with the step of selecting a neighborhood of pixels around a controversial pixel, until the lesser of the number of iterations needed so that no pixels are labeled controversial and a predetermined number of iterations is reached.

25. The method according to claim 19, wherein said neighborhood of pixels is a spatial neighborhood of pixels.

26. A method of video scene background maintenance for a sequence of video frames, comprising the steps of:
  aligning the video frames;
  building a statistical model for each pixel of the aligned video frames; and
  choosing a background state for each pixel of the aligned video frames, comprising the steps of:
    choosing an initial guess for a background state of each pixel, comprising the steps of:
      determining if the pixel has only a single state;
      if so, setting the background state to that single state and labeling the pixel uncontroversial; and
      if not, choosing one of multiple states of the pixel as the background state for the pixel and labeling the pixel controversial; and
    iteratively propagating the initial guesses spatially to neighboring pixels, comprising the steps of:
      iteratively propagating the initial guesses spatially, resulting in iteratively spatially propagated guesses; and
      iteratively propagating the iteratively spatially propagated guesses temporally, comprising the steps of:
        selecting a first spatial neighborhood of pixels around a given pixel;
        comparing the iteratively spatially propagated guess corresponding to the given pixel to each of the iteratively spatially propagated guesses corresponding to the pixels in the first spatial neighborhood; and
        if the iteratively spatially propagated guess corresponding to the given pixel does not temporally overlap any of the iteratively spatially propagated guesses corresponding to the pixels in the first spatial neighborhood, labeling the given pixel temporally controversial, and otherwise labeling the given pixel temporally uncontroversial.

27. The method according to claim 26, further comprising, for each temporally controversial pixel, the steps of:
  selecting a second spatial neighborhood of pixels surrounding the temporally controversial pixel;
  for each pixel in the second spatial neighborhood of pixels, selecting a number of votes for a background state of the temporally controversial pixel, based on whether or not the background state of the pixel in the second spatial neighborhood of pixels maximally overlaps with the background state of the temporally controversial pixel; and selecting a background state of the temporally controversial pixel based on the votes.

28. The method according to claim 27, wherein the step of selecting a number of votes further comprises the steps of:
   selecting a first number of votes if the pixel in the second spatial neighborhood is temporally controversial; and
   selecting a second number of votes if the pixel in the second spatial neighborhood is temporally uncontroversial.

29. The method according to claim 28, wherein the step of selecting a number of votes comprises the steps of:
   selecting the number of votes to be one of the first number of votes and the second number of votes if the background state of the pixel in the second spatial neighborhood of pixels maximally overlaps with the background state of the temporally controversial pixel; and
   selecting the number of votes to be zero if the background state of the pixel in the second spatial neighborhood of pixels does not maximally overlap with the background state of the temporally controversial pixel.

30. The method according to claim 27, wherein the step of selecting a background state of the temporally controversial pixel comprises the step of choosing the background state of the temporally controversial pixel to be a state having the greatest number of votes among all pixels in the second neighborhood of pixels.

31. The method according to claim 30, further comprising the steps of:
   testing to determine if the number of votes for the chosen background state exceeds a predetermined number; and
   if the number of votes exceeds the predetermined number, relabeling the temporally controversial pixel as temporally uncontroversial.

32. The method according to claim 31, further comprising the step of performing further interations, beginning with the step of selecting a second spatial neighborhood of pixels around a temporally controversial pixel, until there are no pixels labeled temporally controversial.

33. The method according to claim 31, further comprising the step of performing further iterations, beginning with the step of selecting a second spatial neighborhood of pixels around a temporally controversial pixel, until the lesser of the number of iterations needed so that no pixels are labeled temporally controversial and a predetermined number of iterations is reached.

* * * * *